Patented July 14, 1953

2,645,674

UNITED STATES PATENT OFFICE 2,645,674

STABILIZED RUBBER ADHESIVE COMPOSITIONS

Paul W. Kinney, Phillipsburg, N. J., assignor to General Aniline & Film Corporation, New York, N. Y., a corporation of Delaware No Drawing. Application November 2, 1950, Serial No. 193,758

3 Claims. (Cl. 260—759)

This invention relates to rubber adhesives and particularly to a rubber adhesive composition in which the rubber is stabilized against molecular degradation.

There are available a variety of rubber adhesive compositions consisting of a solution of raw or crude rubber in the usual hydrocarbon solvents. Strong adhesion of such compositions coupled with non-staining, water-proofness, and permanent resilience makes them suitable for certain uses, such as adhesion to coated and uncoated paper, plastics, rubber, brick work, glass, leather, fabrics, and the like. In order to preclude such compositions from deterioration, by the external influences, such as ozone, light, and heat, it is customary to add an anti-oxidant or age resistor which prevents such deterioration. Although a vast majority of the known and currently used anti-oxidants or age resistors preclude or diminish the deteriorative effect of the external influences caused by ozone, heat mechanical action, and contact with deleterious material, such as copper and copper compounds, and by internal conditions, such as overvulcanization, presence of the deleterious substances and improper choice of compounding ingredients, very little protection, if any, is imparted to rubber adhesive compositions, particularly of the transparent type when exposed to ultraviolet light for several hours.

Most of the available rubber adhesive tapes contain anti-oxidants but their use is limited when films of such adhesive tapes are exposed to sunlight. When so exposed, they deteriorate within a few hours. This deterioration, which is presumably a molecular degradation of the rubber manifests itself by the stickiness imparted to the rubber followed by the development of dryness. In other words, the film first becomes soft and tacky and eventually loses its adhesive properties.

It is an object of the present invention to provide a stabilized rubber composition adaptable for the preparation of adhesive tapes which will not deteriorate upon exposure to sunlight.

Other objects and advantages will become apparent from the following description.

The above and other objects of the present invention are accomplished by adding to a solution or raw or crude rubber containing any one of the customarily used anti-oxidants, an ultraviolet absorbing amount of benzoyl resorcinol. The raw or crude rubber may be any one of the varieties of milled crepe rubber, i. e., pale or brown, blanket crepe, or sheet of raw natural rubber formed by passing undried plantation rubber through one or more washing mills with differential-speed corrugated rolls. The concentration of milled crepe rubber in the adhesive composition may vary from 10 to 30% by weight.

The solvent may be any one or a mixture of solvents normally used in preparing solutions of rubber, such as, for example, gasoline, petroleum naphtha, benzene, toluene, heptane, carbon tetrachloride, propylene chloride, and the like. In addition to the solvent or solvent mixture, it is at times desirable, although not absolutely necessary to incorporate a quantity of a resinous component, such as hydrogenated rosin, coumarone-indene resin, or a polyterpene resin, ranging from 5 to 10 parts by weight to every 10 parts by weight of rubber.

The anti-oxidants or age resistors which may be employed in preparing the rubber adhesive composition may be any one of those currently used. From the great number of spot experiments that I conducted I have arrived at the conclusion that the nature and characteristic of the anti-oxidant is immateral so long as it imparts anti-deteriorative properties to the rubber.

As examples of such anti-oxidants, the following are given merely for the purpose of illustration:

1,5-naphthalene diamine
N,N'-diphenyl phenylenediamine
p-phenylenediamine
N,N'-cyclohexyl-p-phenylenediamine
β-naphthol
N-cyclohexyl-p-phenylenediamine
phenyl-α-naphthylamine
phenyl-β-naphthylamine
N,N'-diphenyl-p-phenylenediamine
o-tolyl-β-naphthylamine.

In addition to the foregoing anti-oxidants, any commercially available anti-oxidant which is readily soluble in rubber or an easily melting solid, which is readily weighed and handled, and taken up by the rubber, may be employed. There are a countless number of such anti-oxidants and any one of them may be employed so long as, as pointed out above, they impart the anti-deteriorative properties.

The quantity of the anti-oxidant employed may range from 0.5 to 2.0% based on the weight of the crepe rubber and is incorporated into the rubber by milling. The rubber is milled out into sheets and cut into strips. The strips are then dissolved in the solvent or solvent mixture.

The addition of the benzoyl resorcinol to the rubber solution may be made with the anti-oxidant. The concentration of the benzoyl resorcinol in this case may vary from 0.1 to 0.3% by weight of the rubber solution. For best results, I have found that the addition of the benzoyl resorcinol is more readily accomplished by adding it in the form of a solution in a lower alkyl alcohol, such as methanol, ethanol, propanol, n-butanol, sec. butanol; a lower alkyl ketone, such as acetone, methyl ethyl ketone, diethyl ketone, methyl propyl ketone, isopropyl methyl ketone, tert. butyl methyl ketone; or a lower alkyl ester, such as methyl acetate, ethyl acetate, butylacetate, sec. butyl acetate, methyl, ethyl, propyl, and butyl formate, and the like, to a solution of the crepe rubber containing the anti-oxidant. The concentration of the benzoyl resorcinol in such solution is so adjusted that the rubber solution contains from 0.1 to 2% of benzoyl resorcinol.

In order to better disclose the invention in detail, the following example is furnished. It is to be understood, however, that this example is merely illustrative and is not intended to limit the scope of the invention.

Example

The following composition was prepared by milling and shredding the milled product. All parts are by weight.

| | |
|---|---|
| Milled crepe rubber | 50.0 |
| N,N'-diphenyl-p-phenylenediamine | 0.4 |
| Hydrogenated rosin | 35.0 |

To 20 parts of the foregoing composition 80 parts of heptane were added and the mixture agitated at room temperature until the shredded rubber was dissolved. The solution was divided into three equal parts. To two of the separate solutions, 8 parts of ethyl acetate were added containing 0.2% and 1.0% by weight, respectively, of benzoyl resorcinol. The third sample, i. e., blank containing no benzoyl resorcinol was retained for comparison with the treated samples.

Each of the three samples, one untreated and two treated, was cast on a glass plate to yield a film of approximately 0.004 inch in thickness and dried in the atmosphere for a period of 24 hours.

The following Table I shows the appearance of the dried film and the changes of tackiness upon exposure to the ultraviolet light of an S-1 sun lamp at a distance of approximately 25 inches. The method of testing consists simply of checking the tackiness of each film with the fingers at various time intervals. When the surface dried, a little more pressure was applied to determine the tackiness of the subsurface film. Deterioration was generally noted by the development of "legs" which are strings of adhesive which adhere to the finger as it is pulled away from the film.

Table I

| | Benzoyl Resorcinol Content Of Solution | | |
|---|---|---|---|
| | 0 | 0.2 | 1.0 |
| Clarity of Dry Film | Clear | Clear | Opaque-White |
| Tackiness of Dry Film | o. k. | o. k. | o. k. |
| Number of Hours of Exposure to U. V.: | | | |
| 16 | 1 inch legs | o. k. | o. k. |
| 24 | 6 inch legs | o. k. | o. k. |
| 40 | 1-3 inch legs (losing tack) | o. k. | o. k. |
| 48 | 1 inch legs (losing tack) | o. k. | o. k. |
| 64 | No tack | o. k. | o. k. |
| 72 | do | o. k. | o. k. |
| 96 | do | 1 inch legs | o. k. |
| 120 | do | 6 inch legs | o. k. |
| 144 | do | do | o. k. |
| 168 | do | do | o. k. |

From the foregoing table, it will be noted that the untreated samples show deterioration or stickiness at 16 hours as evidenced by legs. The inclusion of 1% of benzoyl resorcinol in the dry film (0.2 part per 100 parts of rubber adhesive composition) is sufficient to prolong the life of the film from 16 to 96 hours. This amount does not affect the clarity of the film.

In order to determine the effect of benzoyl resorcinol on heat stability, a series of treated and untreated films were heated in an oven at 100° C. for various time intervals. The effect of heating is shown in the following Table II.

Table II

| Hours Heated at 100° C. | Benzoyl Resorcinol Content Of Solution | | |
|---|---|---|---|
| | 0 | 0.2 | 1.0 |
| 16 | 6 inch legs | o. k. | o. k. |
| 24 | do | o. k. | o. k. |
| 40 | do | 6 inch legs | 6 inch legs |
| 48 | 3 inch legs | 3 inch legs | Do. |
| 64 | 1 inch legs | 1 inch legs | Do. |
| 72 | do | do | 1 inch legs |
| 96 | Slight tack to finger; no tack to paper | do | Do. |

From Table II it is evident that the presence of benzoyl resorcinol in rubber film imparts an anti-oxidant property over and above that of the anti-oxidant milled originally in the crepe rubber. Its presence seems to have some heat stabilizing effect which is not as pronounced as the ultraviolet stabilizing effect. This new and unexpected property of the benzoyl resorcinol is evidently due to a synergistic effect, i. e., it imparts a combination of ultraviolet absorption and anti-oxident effects.

While I have disclosed the preferred embodiment of my invention, it will be readily apparent to those skilled in the art that many changes and variations may be made therein without departing from the spirit and scope thereof. The scope of the invention is to be limited solely by the appended claims.

I claim:

1. A rubber adhesive composition comprising natural rubber, a solvent therefor, a small amount of an arylamine anti-oxidant and a small amount of benzoyl resorcinol.

2. A rubber adhesive composition comprising crepe rubber, containing a small amount of an arylamine anti-oxidant, dissolved in a hydrocarbon solution, and such solution containing a small amount of benzoyl resorcinol.

3. A rubber adhesive composition comprising natural rubber, a small amount of an arylamine anti-oxidant, a hydrocarbon solvent, and benzoyl resorcinol ranging in a concentration from 0.01 to 2 parts by weight per 10 parts by weight of rubber.

PAUL W. KINNEY.

References Cited in the file of this patent

UNITED STATES PATENTS

| Number | Name | Date |
|---|---|---|
| 1,854,601 | Porritt et al. | Apr. 19, 1932 |
| 2,026,442 | Somerville | Dec. 31, 1935 |
| 2,086,418 | Hunt et al. | July 6, 1937 |
| 2,142,039 | Abrams et al. | Dec. 27, 1938 |
| 2,177,627 | Drew | Oct. 31, 1939 |
| 2,325,152 | Sibley | July 27, 1943 |